United States Patent
Adebiyi et al.

(10) Patent No.: US 8,359,277 B2
(45) Date of Patent: Jan. 22, 2013

(54) DIRECTORY INFRASTRUCTURE FOR SOCIAL NETWORKING WEB APPLICATION SERVICES

(75) Inventors: Bilikiss O. Adebiyi, Boston, MA (US);
James C. Boyd, Kennebunk, ME (US);
David A. Brooks, Providence, RI (US);
Michael W. Cross, Portsmouth, NH (US); Patrick Y. Lin, Lexington, MA (US); David E. Wilson, Lowell, MA (US)

(73) Assignee: International Business Machines Corporation, Armonk, NY (US)

( * ) Notice: Subject to any disclaimer, the term of this patent is extended or adjusted under 35 U.S.C. 154(b) by 1244 days.

(21) Appl. No.: 11/963,842

(22) Filed: Dec. 23, 2007

(65) Prior Publication Data

US 2009/0165082 A1   Jun. 25, 2009

(51) Int. Cl.
*G06Q 99/00* (2006.01)

(52) U.S. Cl. . 705/319; 715/745; 707/783; 707/E17.109; 707/785; 707/784; 707/758; 726/1; 726/2; 726/9; 726/17; 726/18; 726/27; 726/30; 726/8; 709/203; 709/219; 709/229

(58) Field of Classification Search ............... 726/6
See application file for complete search history.

(56) References Cited

U.S. PATENT DOCUMENTS

| | | | |
|---|---|---|---|
| 7,065,525 B1 * | 6/2006 | Sasaki et al. | 369/13.01 |
| 2002/0152255 A1 * | 10/2002 | Smith et al. | 709/102 |
| 2005/0177385 A1 * | 8/2005 | Hull et al. | 705/1 |
| 2006/0064495 A1 * | 3/2006 | Tu | 709/228 |
| 2006/0173793 A1 * | 8/2006 | Glass | 705/75 |
| 2006/0224675 A1 * | 10/2006 | Fox et al. | 709/206 |
| 2007/0016791 A1 * | 1/2007 | Bodepudi et al. | 713/182 |
| 2008/0320553 A1 * | 12/2008 | Balay et al. | 726/1 |

* cited by examiner

*Primary Examiner* — Nathan Flynn
*Assistant Examiner* — Bryan Wright
(74) *Attorney, Agent, or Firm* — Cuenot, Forsythe & Kim, LLC

(57) ABSTRACT

A computer-implemented method of implementing information security. The method can include receiving a user input comprising a first user identifier and at least a second user identifier, determining whether the first user identifier corresponds to at least one of a plurality of existing user profiles, and determining whether the second user identifier corresponds to at least one of the plurality of existing user profiles. When it is determined that the first user identifier does not correspond to at least one of the plurality of existing user profiles, but that the second user identifier does correspond to at least one of the plurality of existing user profiles, the method can include selecting the user profile to which the second user identifier corresponds, automatically generating a unique user identifier, and associating the unique user identifier with the selected user profile.

20 Claims, 2 Drawing Sheets

DIRECTORY INFRASTRUCTURE FOR SOCIAL NETWORKING WEB APPLICATION SERVICES

BACKGROUND OF THE INVENTION

With the continued proliferation of computing and networking technologies, information security now is a concern for most organizations, regardless of their size. Indeed, several levels of security are oftentimes implemented within an organization's data network to control access to network resources. In such a data network, a user wishing to access a particular network resource (e.g. data, application, hardware, or the like) must first be authenticated before access can be granted. In that regard, such information security tends to be user centric.

Social networks now are commonly used by organizations as cost effective solutions for managing information for such users. Social networks often rely on a collaboration of a variety of disparate data sources, which can be quite complex. To facilitate such collaboration, internal identifiers typically are used to provide links between different data groups. The internal identifiers can be based on user names, employee identifiers, departments, geographic locations, or any other type of identifiers that may be associated with the data groups.

Management of the internal identifiers has shown to be vital to the success of social networks. Oftentimes the internal identifiers are tightly bound to directory infrastructure that was first deployed using the internal identifiers. Thus, any changes to such infrastructure will typically have a significant impact on the accessibility of user information. For instance, if an internal identifier associated with a user changes, and such change is not implemented within each of the data sources containing the user's information, the links between the data sources may be severed.

BRIEF SUMMARY OF THE INVENTION

The embodiments disclosed herein relate to information security. One embodiment of the present invention can include a computer-implemented method of implementing information security. The method can include receiving a user input comprising a first user identifier and at least a second user identifier, determining whether the first user identifier corresponds to at least one of a plurality of existing user profiles, and determining whether the second user identifier corresponds to at least one of the plurality of existing user profiles. When it is determined that the first user identifier does not correspond to at least one of the plurality of existing user profiles, but that the second user identifier does correspond to at least one of the plurality of existing user profiles, the method can include selecting the user profile to which the second user identifier corresponds, automatically generating a unique user identifier, and associating the unique user identifier with the selected user profile.

Another embodiment of the present invention can include a server. The server can receive a user input comprising a first user identifier and at least a second user identifier, determine whether the first user identifier corresponds to at least one of a plurality of existing user profiles, and determine whether the second user identifier corresponds to at least one of the plurality of existing user profiles. When it is determined that the first user identifier does not correspond to at least one of the plurality of existing user profiles, but that the second user identifier does correspond to at least one of the plurality of existing user profiles, the server can select the user profile to which the second user identifier corresponds, automatically generate a unique user identifier, and associate the unique user identifier with the selected user profile.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

Figure 1:
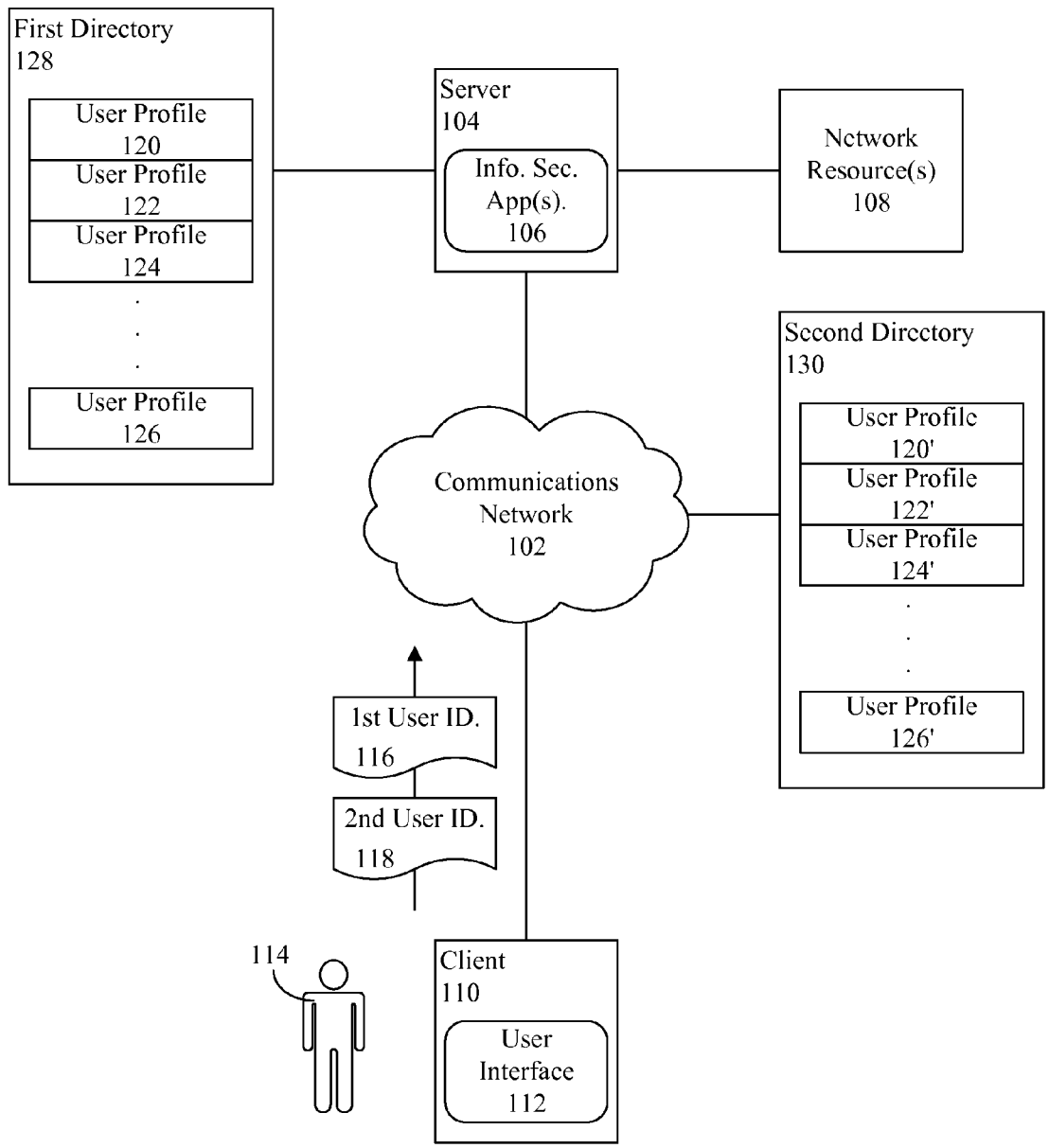
FIG. 1 is a block diagram illustrating a system for implementing information security in accordance with one embodiment of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, a magneto-optical disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram illustrating a system 100 for implementing information security in accordance with one embodiment of the present invention. The system 100 can include a communications network 102. The communications network 102 can be implemented as, or include, without limitation, a WAN, a LAN, the Public Switched Telephone Network (PSTN), the Web, the Internet, and one or more intranets. The communications network 102 further can be implemented as or include one or more wireless networks, whether short or long range. For example, in terms of short range wireless networks, the communications network 102 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communications network 102 can include a mobile, cellular, and/or satellite-based wireless network and support voice, video, text, and/or any combination thereof, e.g., GSM, TDMA, CDMA, and/or WCDMA network.

The system 100 also can include a server 104. The server 104 can be any system or device that can perform server functions within the network architecture. For example, the server 104 can run server operating systems, information security applications 106, as well as provide access to network resources 108 via the communications network 102. Such network resources 108 can include, but are not limited to, applications, data tables, data files, hardware, and the like. The network resources 108 can be resident on the server 104, or accessible to the server 104 via a communications network, for example via the communications network 102.

In addition, the server 104 can receive messages from the communications network 102 and process such messages. For example, the server 104 can initiate events in response to such messages, forward such messages to other nodes of the network, or perform any other suitable communication functions for the network. As such, the server 104 can comprise one or more processors/controllers, data storage devices, user interfaces, communication adapters, and/or other suitable components, such as those previously described. In one embodiment, the server 104 can be implemented as IBM® WebSphere® Business Integration Server (IBM and WebSphere are trademarks of International Business Machines Corporation in the United States, other countries, or both).

The system 100 also can include a client 110. The client 110 can be any computing device comprising a user interface 112 capable of receiving inputs from a user, and which can communicate such inputs to the server 104 via the communications network 102. The client 110 can also facilitate user interactions with the network resources 108. The client 110 can be implemented as, but is not limited to, a personal computer, a workstation, a wired or wireless handheld device, a touch screen device, a telephone, an entertainment or broadcast media device, an audio input transducer (e.g. microphone), a gaming console, a set-top box, an information kiosk, or any other device capable of providing the user access to the server 104 and/or network resources 108.

In operation, a user 114 wishing to access one or more network resources 108 can input a plurality of user identifiers 116, 118 into the user interface 112 of the client 110, and the client 110 can communicate such user identifiers 116, 118 to the server 104. The identifiers 116, 118 can be communicated within a request to access the network resources 108, or in one or more other messages.

The user identifiers 116, 118 can be identifiers that are unique to the user 114. For example, the first user identifier 116 can comprise a security identifier (SID) or a universally unique identifier (UUID). The SID and/or UUID may be static, never re-used, and maintained by the server 104. For example, the SID and/or UUID can be created and maintained by the information security application 106, which can be a lightweight directory access protocol (LDAP) server application, a dedicated information security application, or any other suitable application instantiated within the system 100. Further, the second user identifier 118 can comprise any other identifier that is unique to the user 114. For example, the second user identifier 118 can comprise an e-mail address, an employer identifier, a social security number, or the like.

The information security application 106 can receive and process the user identifiers 116, 118 in accordance with the processes and methods described herein. For example, in response to receiving the user identifiers 116, 118, the information security application 106 can determine whether the user identifiers 116, 118 correspond to at least one of a plurality of user profiles 120, 122, 124, 126. Such user profiles 120-126 can be maintained in one or more data tables, one or more data files, one or more text files, or in any other suitable manner. Further, the user profiles 120-126 can be resident on the server 104, or stored elsewhere in the system 100 and made accessible to the server 104, for example via the communications network 102 or another suitable communication link.

If each of the user identifiers 116, 118 correspond to a particular user profile 120, the information security application 106 can provide to the user 114 access to network resources 108 which are requested by the user 114 and which the user 114 is authorized to access. Determination of which network resources 108 the user is authorized to access can be based on the particular user profile or other data available to the information security application 106.

If fewer than each of the user identifiers 116, 118 corresponds to a particular user profile 120, the user profile 120 can be updated with the non-corresponding user identifiers 116, 118. For example, if the first user identifier 116 corresponds to a user profile 120, but the second user identifier 118 does not, the user profile 120 to which the first user identifier 116 corresponds can be updated with the second user identifier 118. Such update can be implemented automatically in response to a prompt by the information security application 106, or a user (e.g. the user 114 or a system administrator) can be prompted to manually update the user profile 120. The user 114 then can be granted access to the requested resources which the user 114 is authorized to access, or access can be denied until changes to the user profile are accepted, for instance by an administrator.

If none of the user identifiers 116, 118 match an existing user profile, a new user profile 126 can be generated. For example, the user profile 126 can be generated automatically in response to a prompt by the information security application 106, or a user can be prompted to generate the user profile 126. In an arrangement in which the user profile 126 is generated automatically, the user profile 126 can be presented to a user. The user can confirm the information contained in the user profile 126, change or update information contained in the user profile 126 and/or add information to the user profile 126. Such additional information can include, for example, a common name, a distinguished name, a surname, a given name, a display name, and so on.

Updates to, and creation of, the user profiles 120-126 can be implemented in any suitable manner. For example, if a static synchronization mechanism is implemented so that an administrator can statically manage the user profiles 120-126, Java Management Extension (JMX) can be implemented to manage user profile information through managed bean (MBean) services. Accordingly, administrators can be provided the exclusive authority to manage such user profile information. Notwithstanding, management of the user profiles 120-126 also can be implemented dynamically (e.g. using automated functions), and the invention is not limited in this regard.

It should be noted that a given user need not be limited to a single user profile. For instance, the user 114 can be associated with a plurality of user profiles 120-122 and a second user (not shown) can be associated with a plurality of user profiles 124-126. Notably, each of the user profiles 120-126 can have a first user identifier 116 (e.g. a UUID or SID) that is unique.

Further, an application-oriented profile identifier (AOID) can be generated to associate one or more of the user profiles 120-126 with a particular network resource 108. For example, a first AOID can be generated which is exclusively unique to a first of the network resources 108, a second AOID can be generated which is exclusively unique to a second of the network resources 108, and so on. Each of the AOIDs then can be associated with one or more user profiles 120-126. For example, each of the AOIDs can be mapped to one or more of the user identifiers that are each unique to a particular user profile 120-126. The AOID mappings can be implemented using structured query language, or in any other suitable manner.

In one arrangement, each AOID mapping for a particular network resource 108 can be self-contained within the network resource. For example, AOID mappings for a particular application can be contained within the application's boundary. As used herein, to contain a mapping within an application boundary means to associate the mapping with the application such that the application does not rely upon other external data sources to retrieve the mapping. For instance, the mapping can be incorporated into the application itself, or within a local application database. Thus the mapping can remain available to the application, regardless of the availability of a particular external data source (e.g. a directory storage space). Moreover, if an external data source is lost and then recreated, the mapping within the application boundary can be accessed and incorporated within the recreated data source to maintain the AOID mappings. In this regard, maintaining the AOID mappings within the application boundary can provide a significant level of data security and portability to the network resources 108. Indeed, the network resources 108 can be easily recreated and/or relocated from one location within the system 100 to another without the requirement of being tied to infrastructure identifiers of a back-end directory.

Further, the user profiles 120-126 can be copied and stored elsewhere in the system 100. For example, a first copy of the user profiles 120-126 can be stored in a first directory 128 on a first node of the system 100, and a second copy of the user profiles 120', 122', 124', 126' can be stored in a second directory 130 on a second node of the system 100. In such an arrangement, the information security application 106 and/or network resources 108 can be initially pointed to the first directory 128 in order to access the user profiles 120-126, but can be redirected to the second directory 130 at a later time. For example, assume that the information security application 106 is initially directed to the first directory 128, and that the information security application 106 identifies that the first user identifier 116 and/or the second user identifier 118 is contained in a user profile 120' contained in the second directory 130. The information security application 106 then can automatically synchronize the user profile 120' in the second directory 130 with the user profile 120 in the first directory 128 and can begin accessing user information from the user profile 120'.

Figure 2:
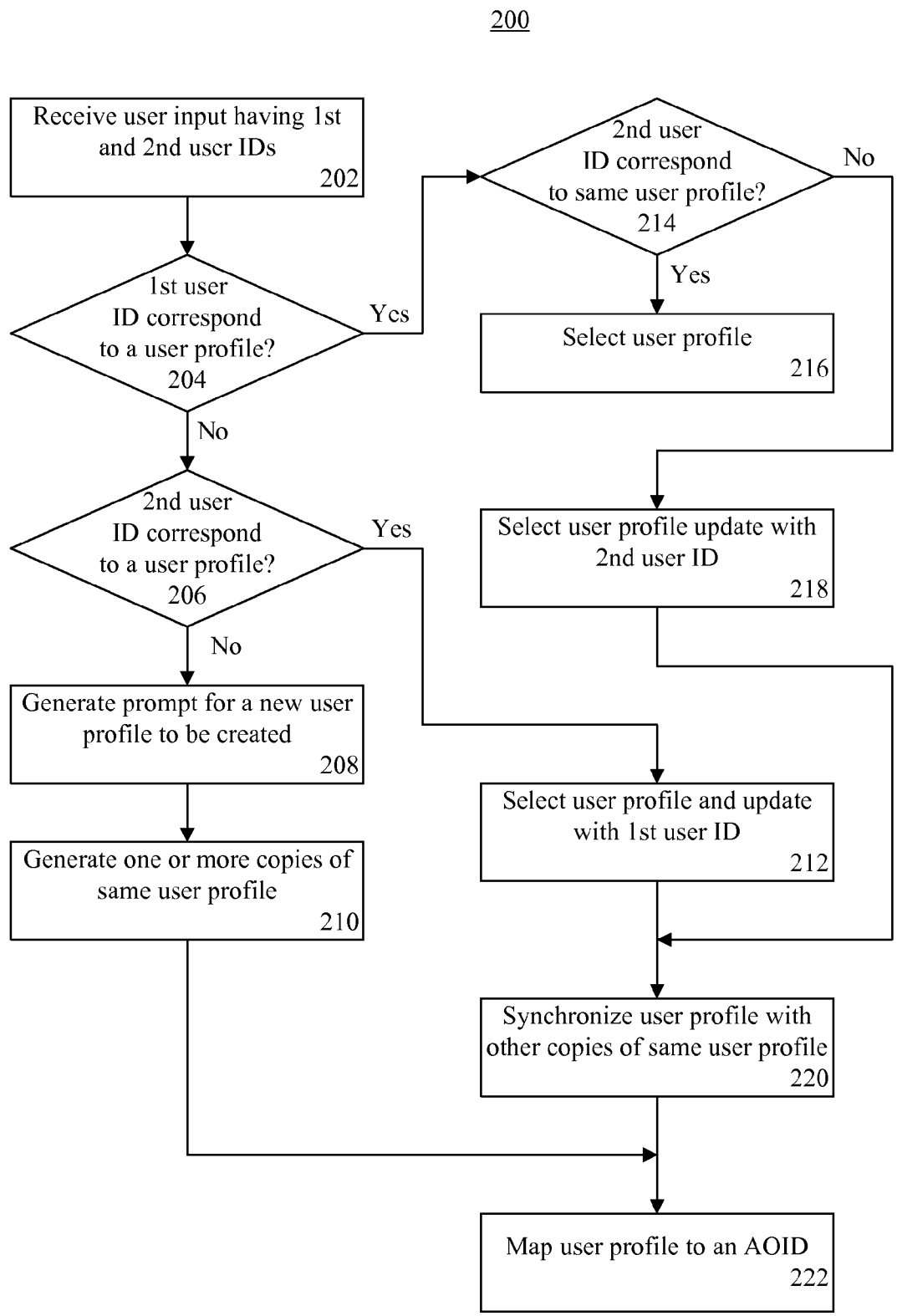
FIG. 2 is a flowchart illustrating a method of implementing information security in accordance with another embodiment of the present invention.

FIG. 2 is a flowchart illustrating a method 200 of implementing information security in accordance with another embodiment of the present invention. The method 200 can be implemented by the information security application, or another suitable component of the system. The method 200 can begin in a state in which a user has entered, via the user interface of the client, a user input comprising the first user identifier and at least a second user identifier. As noted, the first user identifier can be a UUID or an SID, and the second user identifier can be an e-mail address, an employee identification number, a social security number, or any other identifier unique to the user.

At step 202 first and second user identifiers can be received. Referring to decision boxes 204 and 206, if neither the first user identifier nor the second user identifier correspond a user profile, then at step 208 a prompt can be generated for a new user profile to be created. As noted, the prompt can indicate to an administrator to manually create the user profile, or the prompt can indicate to the information security application, or another suitable application, to automatically create the new user profile using the first and second identifiers. The user also can be prompted to add and/or update additional user information to the new user profile. At step 210, one or more copies of the new user profile can be generated and stored in another directory elsewhere in the system.

Referring again to decision boxes 204 and 206, if the first user identifier does not match a user profile, but the second user identifier does, at step 212 the user profile corresponding to the second identifier can be selected and updated to include the first identifier. For example, if the second user identifier is an e-mail address that matches a user profile, but the first identifier is a UUID or SID that does not match the same user profile, then the user profile can be selected and updated with the UUID or SID.

Referring again to decision box 204, and to decision box 214, if both the first and second user identifiers correspond to the same user profile, at step 216 the user profile can be selected and processed for determining whether to grant the user access to requested network resources. If, however, the first user identifier corresponds to a user profile, but the second user identifier does not, then at step 218 the user profile corresponding to the first identifier can be selected and updated with the second identifier. For example, if the first user identifier is a UUID or SID that matches a user profile, but the second identifier is an e-mail address that does not match the same user profile, then the user profile can be selected and updated with the e-mail address.

At step 220, the user profile that has been updated with either a new first or second identifier can be synchronized with other copies of the same user profile resident in another directory in the system. Optionally, at step 222, the user profile selected at step 216, step 212 or step 218 can be mapped to an application-oriented profile identifier, as previously described. For example, an administrator can be prompted to implement such mapping, or a prompt can be generated to implement such mapping automatically.

As used herein, "generate" or "generating" can include, but is not limited to, writing to a file, writing to a user display or other output device, playing audible notifications, sending or transmitting to another system, exporting, or the like.

The flowchart(s) and block diagram(s) in the figures illustrate the architecture, functionality, and operation of possible implementations of systems, methods and computer program products according to various embodiments of the present invention. In this regard, each block in the flowchart(s) or block diagram(s) may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method of implementing information security, the method comprising:
   determining, using a computer hardware system and from a received user input comprising a first user identifier and at least a second user identifier, whether the first user identifier corresponds to at least one of a plurality of existing user profiles;
   determining, using the computer hardware system, whether the second user identifier corresponds to at least one of the plurality of existing user profiles; and
   upon the first user identifier not corresponding to at least one of the plurality of existing user profiles, and the second user identifier corresponding to at least one of the plurality of existing user profiles:
   selecting the user profile to which the second user identifier corresponds; and associating the first user identifier with the selected user profile.

2. The computer-implemented method of claim 1, further comprising:
when it is determined that neither the first user identifier nor the second user identifier corresponds to at least one of the plurality of existing user profiles, generating a prompt for a new user profile to be created.

3. The computer-implemented method of claim 2, further comprising:
communicating the prompt to a client for presentation to a user.

4. The computer-implemented method of claim 2, further comprising:
automatically generating the new user profile in response to the generated prompt.

5. The computer-implemented method of claim 4, further comprising:
associating the new user profile with an automatically generated unique user identifier.

6. The computer-implemented method of claim 5, further comprising:
mapping the first user identifier with an application-oriented profile identifier that is exclusively associated with a particular application.

7. The computer-implemented method of claim 1, further comprising:
mapping the first user identifier with an application-oriented profile identifier that is exclusively associated with a particular application.

8. The computer-implemented method of claim 1, further comprising:
automatically synchronizing the selected user profile with a copy of the selected user profile, the copy of the selected user profile being contained in a second directory that is different than a first directory in which the selected user profile is contained.

9. The computer-implemented method of claim 8, further comprising:
redirecting a network resource from the first directory to the second directory.

10. A computer program product comprising:
a non-transitory computer-usable storage comprising computer-usable program code stored thereon that implements information security, the computer-usable storage comprising:
computer-usable program code that receives a user input comprising a first user identifier and at least a second user identifier;
computer-usable program code that determines whether the first user identifier corresponds to at least one of a plurality of existing user profiles;
computer-usable program code that determines whether the second user identifier corresponds to at least one of the plurality of existing user profiles; and
computer-usable program code that, when it is determined that the first user identifier does not correspond to at least one of the plurality of existing user profiles, but that the second user identifier does correspond to at least one of the plurality of existing user profiles:
selects the user profile to which the second user identifier corresponds; and
associates the first user identifier with the selected user profile.

11. The computer program product of claim 10, the computer-usable storage further comprising:
computer-usable program code that, when it is determined that neither the first user identifier nor the second user identifier corresponds to at least one of the plurality of existing user profiles, generates a prompt for a new user profile to be created.

12. The computer program product of claim 11, the computer-usable storage further comprising:
computer-usable program code that communicates the prompt to a client for presentation to a user.

13. The computer program product of claim 11, the computer-usable storage further comprising:
computer-usable program code that automatically generates the new user profile in response to the generated prompt.

14. The computer program product of claim 13, the computer-usable storage further comprising:
computer-usable program code that associates the new user profile with an automatically generated unique user identifier.

15. The computer program product of claim 14, the computer-usable storage further comprising:
computer-usable program code that maps the first user identifier with an application-oriented profile identifier that is exclusively associated with a particular application.

16. The computer program product of claim 10, the computer-usable storage further comprising:
computer-usable program code that maps the first user identifier with an application-oriented profile identifier that is exclusively associated with a particular application.

17. The computer program product of claim 10, the computer-usable storage further comprising:
computer-usable program code that automatically synchronizes the selected user profile with a copy of the selected user profile, the copy of the selected user profile being contained in a second directory that is different than a first directory in which the selected user profile is contained.

18. The computer program product of claim 10, the computer-usable storage further comprising:
computer-usable program code that redirects a network resource from the first directory to the second directory.

19. A server that receives a user input comprising a first user identifier and at least a second user identifier, determines whether the first user identifier corresponds to at least one of a plurality of existing user profiles, determines whether the second user identifier corresponds to at least one of the plurality of existing user profiles; and
when it is determined that the first user identifier does not correspond to at least one of the plurality of existing user profiles, but that the second user identifier does correspond to at least one of the plurality of existing user profiles, selects the user profile to which the second user identifier corresponds, and associates the first user identifier with the selected user profile.

20. The server of claim 19, wherein the server generates a prompt for a new user profile to be created when it is determined that neither the first user identifier nor the second user identifier corresponds to at least one of the plurality of existing user profiles.

* * * * *